(12) United States Patent
Hilfrich et al.

(10) Patent No.: US 9,975,310 B2
(45) Date of Patent: May 22, 2018

(54) METAL SHEET OR STRIP FOR A MOTOR VEHICLE COMPONENT

(71) Applicants: ThyssenKrupp Steel Europe AG, Duisburg (DE); ThyssenKrupp AG, Essen (DE)

(72) Inventors: Erik Hilfrich, Dusseldorf (DE); David Pieronek, Dortmund (DE)

(73) Assignees: ThyssenKrupp Steel Europe AG, Duisburg (DE); ThyssenKrupp AG, Essen (DE)

( * ) Notice: Subject to any disclaimer, the term of this patent is extended or adjusted under 35 U.S.C. 154(b) by 265 days.

(21) Appl. No.: 14/742,056

(22) Filed: Jun. 17, 2015

(65) Prior Publication Data

US 2015/0367597 A1    Dec. 24, 2015

(30) Foreign Application Priority Data

Jun. 18, 2014  (DE) .................. 10 2014 008 718

(51) Int. Cl.
| | | |
|---|---|---|
| *B32B 5/14* | (2006.01) | |
| *B32B 15/01* | (2006.01) | |
| *B21D 35/00* | (2006.01) | |
| *B21D 53/88* | (2006.01) | |
| *B32B 15/04* | (2006.01) | |

(52) U.S. Cl.
CPC .......... *B32B 5/145* (2013.01); *B21D 35/006* (2013.01); *B21D 53/88* (2013.01); *B32B 15/01* (2013.01); *B32B 15/043* (2013.01); *B32B 2605/00* (2013.01); *Y10T 428/12389* (2015.01)

(58) Field of Classification Search
CPC ..... B32B 5/145; B32B 15/01; B32B 2605/00; B32B 15/043; B21D 35/006; B21D 53/88; Y10T 428/12389
See application file for complete search history.

(56) References Cited

U.S. PATENT DOCUMENTS

| | | | | |
|---|---|---|---|---|
| 6,293,134 | B1 * | 9/2001 | Johnson .............. | B21D 19/088 |
| | | | | 29/897.2 |
| 2008/0268277 | A1 * | 10/2008 | Hilfrich .............. | B23K 26/26 |
| | | | | 428/600 |
| 2010/0117400 | A1 | 5/2010 | Eberlein | |

FOREIGN PATENT DOCUMENTS

| | | | |
|---|---|---|---|
| DE | 4332730 | C2 | 1/1996 |
| DE | 19503166 | C2 | 3/1997 |
| DE | 102005006606 | * | 3/2006 |
| DE | 102005006606 | B3 | 3/2006 |
| DE | 102008041172 | A1 | 3/2010 |
| EP | 2228459 | A1 | 9/2010 |
| NL | 1009583 | C2 | 1/2000 |

OTHER PUBLICATIONS

English translation of DE102005006606.*

* cited by examiner

*Primary Examiner* — Peter F Godenschwager
*Assistant Examiner* — Andrew J. Oyer
(74) *Attorney, Agent, or Firm* — The Webb Law Firm

(57) ABSTRACT

A tailored semifinished part (5, 6, 7, 8, 9) is disclosed in the form of a metal sheet or strip which is formed from a first blank (1) and at least one second blank (2) and the first and at least one second blank are physically, frictionally and/or adhesively (3) joined to one another. The first blank (1) may be an ultrahigh-strength, monolithic material. A motor vehicle component (5', 6', 7', 8', 9') may be made of the tailored semifinished part (5, 6, 7, 8, 9).

9 Claims, 2 Drawing Sheets

METAL SHEET OR STRIP FOR A MOTOR VEHICLE COMPONENT

CROSS-REFERENCE TO RELATED APPLICATION

This application claims priority to German Patent Application No. 102014008718.2 filed Jun. 18, 2014, the disclosure of which is hereby incorporated in its entirety by reference.

BACKGROUND OF THE INVENTION

Field of the Invention

The invention relates to a tailored semifinished part in the form of a metal sheet or strip which is formed from a first plate and at least one second plate and the first and at least one second plate are physically, frictionally and/or adhesively joined to one another, where the first plate consists of an ultrahigh-strength, monolithic material, and also a motor vehicle component made of the tailored semifinished part of the invention.

Description of Related Art

Tailored semifinished parts are known from the prior art and are referred to in the art as "tailored blanks" or "tailored welded blanks" for metal sheets and as "tailored strips" or "tailored welded coils" for strip-like, in particular rolled-up, rolls/coils. They have the advantage that they can be processed further to give components, in particular motor vehicle components, which compared to monolithic materials have properties which can be individually configured according to need. For example, at least two materials of the same type having different sheet thicknesses or else materials of different types can be joined to one another.

Examples of tailored semifinished parts and also structural components produced therefrom for motor vehicles are disclosed under the link: http://www.i-car.com/pdf/advantage/online/2004/120604.pdf. Furthermore, a process for producing a component for a motor vehicle is known from the European patent document 2 228 459. The semifinished part disclosed, which consists of a blank composed of a hardenable steel material and a blank composed of a high-manganese steel material which are joined to one another by means of a laser welded seam, is heated to an austenitization temperature of the hardenable steel material and shaped in a hot forming tool and at the same time cooled in such a way that a martensitic microstructure is formed in the hardened steel material. Thus, different properties can be set in the component. The hardened region has high tensile strengths at a relatively low elongation at break, while the region formed by the high-manganese steel material has no significant property loss even after the heat treatment, viz, the high elongation at break is retained at a moderate tensile strength. In the case of components which are stressed in a crash in automobile construction, in particular, at least two different regions which can be divided into at least one strong/hard region which in the case of a crash prevents intrusion and protects the passenger cell and at least one soft/ductile region which absorbs crash energy by deformation are advantageous. However, soft/ductile materials which have a high elongation at break have limited tensile strength. In addition, not all materials are suitable for hot forming without their properties, in particular in respect of the elongation at break, being impaired as a consequence of hardening. The trend in automobile construction is to reduce the vehicle weight in order to reduce the emission of $CO_2$.

This can be achieved by, firstly, replacement of materials with, for example, lighter materials, which in the case of some components is not possible or possible only with great difficulty and, associated therewith, generally also only at greater cost, or, secondly, by a further reduction in the thickness of existing components, in which case the necessary increase in the strength of the material comes up against technical limits.

SUMMARY OF THE INVENTION

Proceeding therefrom, it is an object of the present invention to provide a tailored semifinished part for producing a motor vehicle component, which has comparable or improved properties at a reduced mass.

The object indicated for a semifinished part of the type in question is achieved by the at least one second blank consisting of a metallic multilayer composite and the monolithic material and/or the metallic multilayer composite having different thicknesses in regions, in particular being configured as flexibly rolled semifinished part.

The inventors have found that metallic multilayer composites are very suitable for setting materials properties which a monolithic material cannot have. The flexible selection and combination of different materials makes it possible for properties which have hitherto been conflicting, for example high tensile strengths with a simultaneously high elongation at break, to be combined in a semifinished part. There is a potential for reduction in weight of a motor vehicle component in the regions of a component or of a tailored semifinished part in which a high elongation at break is necessary. The targeted combination of suitable metallic materials in the multilayer composite makes it possible for the thickness in this region to be reduced further as a result of an increase in the tensile strength at a required elongation at break, which can have an advantageous effect on the weight of the total component. The metallic multilayer composite preferably consists of at least three metal layers, where at least the metallic core layer has a different composition and in particular a higher strength compared to the at least one metallic covering layer. Preference is given to using steel materials. The metallic multilayer composite is preferably produced by roll-bonding. Such a process is described, for example, in the German patent document 10 2005 006 606. As an alternative, casting processes are also possible, for example when aluminium materials are used. The configuration according to the invention also provides for the monolithic material and/or the metallic multilayer composite to have different thicknesses in regions and being, in particular, configured as flexibly rolled semifinished part. Flexible rolling or processes known in the art under the name "tailored rolled blank" makes a further weight saving potential possible. Thus, various combinations, for example, are also possible for providing the semifinished part of the invention.

According to a first embodiment of the invention, at least one further blank is physically, frictionally and/or adhesively joined to the first and/or second blank, with the further blank consisting of a metallic multilayer composite or monolithic material. This has the advantage that the semifinished part or motor vehicle component has more than two regions having different properties and new functions which can replace further components can be introduced by targeted selection and arrangement on the component. This makes a further weight saving potential possible.

The tailored semifinished part of the invention can be designed either for hot forming or for cold forming. In the context of hot forming, the term "ultrahigh-strength" refers to steel materials which in the finished state in the component have a tensile strength of at least 1200 MPa, in particular at least 1500 MPa. In the cold forming of steel materials, a tensile strength of at least 700 MPa is intended. When aluminium materials are used, tensile strengths of at least 400 MPa in the finished component are intended.

In a further embodiment of the invention, the first blank consists of an ultrahigh-strength, in particular hardenable, steel material. Steel materials having a tensile strength of at least 700 MPa, in particular at least 800 MPa, particularly preferably at least 900 MPa, are suitable for cold forming. After hot forming, this region has very high tensile strengths in the finished component. Hardenable materials are preferably manganese-boron steels. Depending on the material composition and in particular as a function of the carbon content, it is possible to achieve tensile strengths of at least 1500 MPa, in particular at least 1800 MPa.

In a further embodiment of the invention, at least one layer of the metallic multilayer composite, in particular the core layer, particularly preferably consists of an ultrahigh-strength, in particular hardenable, steel material. This has the advantage that, in particular, the tensile strength of the composite can be set in a targeted manner via the thickness of the core layer. In the case of a preferably three-layer steel composite, the two covering layers preferably consist of a ductile steel material which is not hardenable and have a tensile strength which is, for example, less than one third of the tensile strength of a hardenable steel material in the finished state and the elongation at break can be appropriately adapted by varying the thickness thereof. As an alternative, the steel composite having a core layer can consist of a steel material having a high elongation at break and covering layers composed of an ultrahigh-strength, in particular hardenable, steel material. The composite is not restricted to three layers.

Provision of a tailored semifinished part according to the invention makes it possible to produce motor vehicle components which satisfy the necessary requirements and have a lower weight. Structural components, in particular A, B, C, D columns, side wall frames, sills, longitudinal bars, transverse bars, tunnel reinforcements, roof frames or crash boxes are preferably produced therefrom.

BRIEF DESCRIPTION OF THE DRAWINGS

The invention is illustrated below with the aid of a drawing depicting examples. The same parts are provided with the same reference numerals. The drawing shows.

DESCRIPTION OF THE INVENTION

Figure 1:
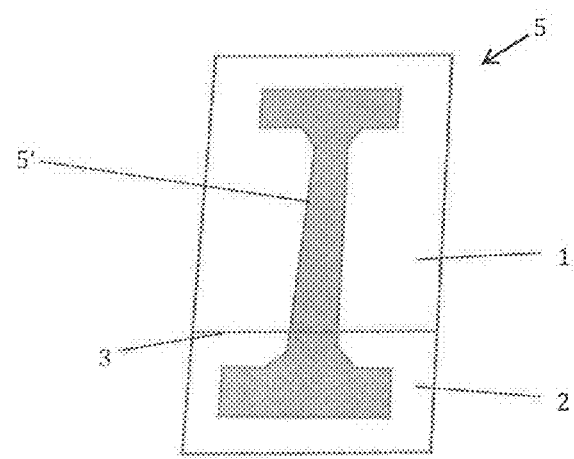
FIG. 1 shows a first motor vehicle component produced from a tailored semifinished part according to the invention in schematic side view.

FIG. 1 shows a first motor vehicle component (5') in the form of a B column in schematic side view. The tailored semifinished part (5) according to the invention which is designed for producing or forming to give a B column (5') has a first blank (1) composed of an ultrahigh-strength, monolithic steel material, preferably a hardenable steel material, and a second blank (2) composed of a metallic multilayer composite, preferably having a core layer composed of a hardenable steel material having a thickness in the range from 50% to 80% of the total thickness of the composite and two covering layers composed of a ductile steel material which is not hardenable. The two blanks (1, 2) are joined to one another by means of a welding seam (3) in a butt joint to form one piece; they are preferably joined to one another individually by means of a laser or in strip form preferably by means of high-frequency welding. The use of a metallic multilayer composite (2) enables high tensile strengths and high elongation at break to be set in a targeted manner, as a result of which the thickness of the composite (2) can be reduced further and a component (5') which, compared to the components known from the prior art, has comparable or improved properties at a reduced mass can be provided. Furthermore, the blank (1) can also be configured as a flexible rolled semifinished part.

Figure 2A:
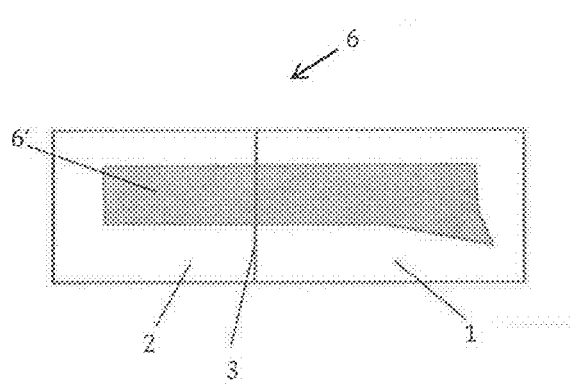
FIGS. 2a and 2b show a second and third motor vehicle component produced from a tailored semifinished part according to the invention in schematic side view.
Figure 2B:
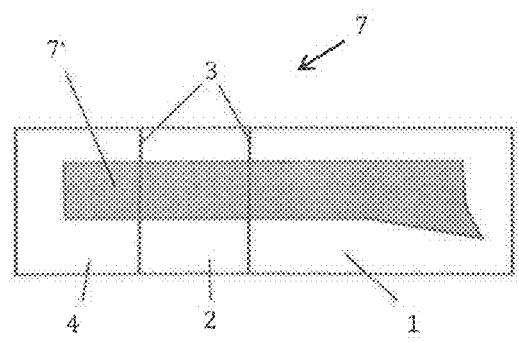

FIG. 2a shows a second motor vehicle component (6') in the form of a front longitudinal bar in schematic side view. The tailored semifinished part (6) according to the invention which is designed for the production or forming to give a longitudinal bar (6') consists of a first blank (1) and a second blank (2), as described in FIG. 1. To avoid repetition, reference is made to the first figure description. It is also conceivable for the blank (1) and/or the blank (2) to be configured as flexibly rolled semifinished part. In FIG. 2b, the tailored semifinished part (7) according to the invention has a further blank (4) which is, for example, composed of a ductile monolithic material, but preferably a further metallic multilayer composite, which has a higher elongation at break and a preferably reduced tensile strength compared to the blank (2) to which it is joined by a welding seam (3) to form one piece, so that new functions can be introduced by targeted selection and arrangement on the component, for example by integration of the crash box on the front longitudinal bar (7'). This makes it possible to replace further components, in this example conventional crash boxes, as a result of which the total weight of the bodywork can be reduced further.

Figure 3:
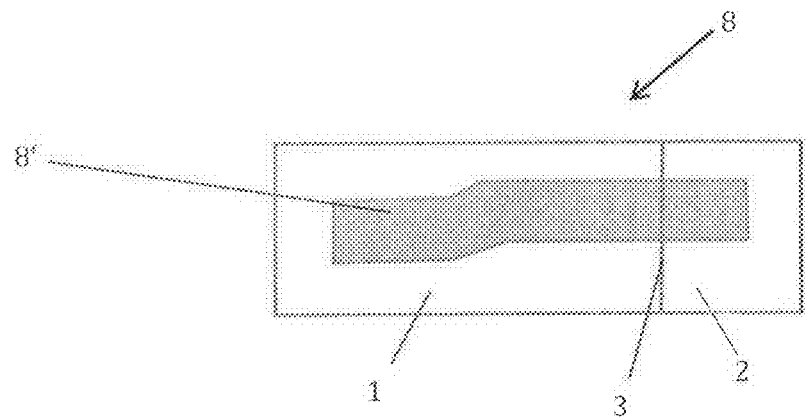
FIG. 3 shows a fourth motor vehicle component produced from a tailored semifinished part according to the invention in schematic side view and FIG. 4 shows a fifth motor vehicle component produced from a tailored semifinished part according to the invention in schematic side view.

FIG. 3 shows a fourth motor vehicle component (8') in the form of a front longitudinal bar in schematic side view. The tailored semifinished part (8) according to the invention which is designed for producing or forming to give a longitudinal bar (8') consists of a first blank (1) composed of a preferably hardenable monolithic steel material and a second blank (2) composed of a metallic multilayer composite, preferably having a core layer composed of a hardenable steel material and two covering layers composed of a ductile steel material which is not hardenable, as described in FIG. 1, which are joined to one another via a welding seam (3) to form one piece. It is also conceivable for the blank (1) and/or the blank (2) to be configured as flexibly rolled semifinished part.

Figure 4:
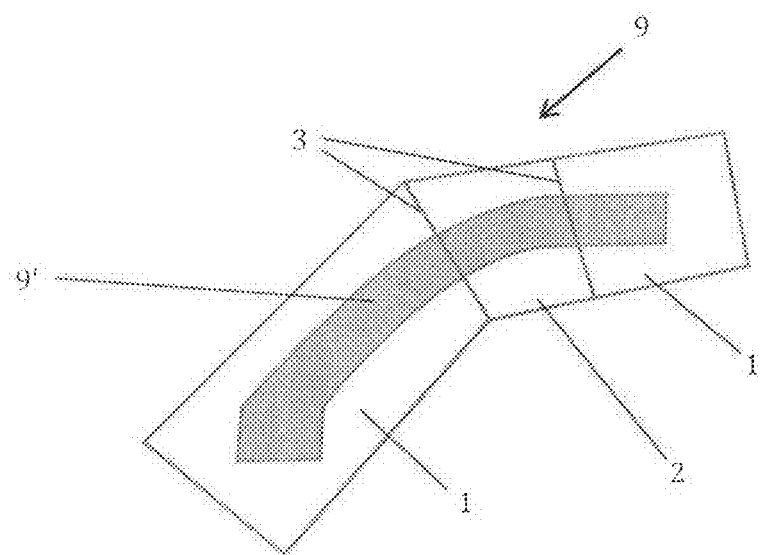

FIG. 4 shows a fifth motor vehicle component (9') in the form of an A column in schematic side view. The tailored semifinished part (9) according to the invention which is designed for producing or forming to give an A column (9') consists of two blanks (1) each composed of an ultrahigh-strength, monolithic steel material, preferably a hardenable steel material, and a blank (2) which is arranged between the two blanks (1) and is joined to these by means of welding seams (3) to form one piece and is composed of a metallic multilayer composite, preferably having a core layer composed of a hardenable steel material having a thickness in the range from 50% to 80% of the total thickness of the composite and two covering layers composed of a ductile steel material which is not hardenable. It is also conceivable for one or both blanks (1) and/or the blank (2) to be configured as flexibly rolled semifinished part.

LIST OF REFERENCE NUMERALS

1 ultrahigh-strength, monolithic material (first blank)
2 metallic multilayer composite (second blank)
3 welding seam
4 ductile material
5 semifinished part for B column
5' B column
6 semifinished part for a front longitudinal bar
6' front longitudinal bar
7 semifinished part for a rear longitudinal bar
7' rear longitudinal bar
8 semifinished part for A column
8' A column

The invention claimed is:

1. A metal sheet or strip which is formed from a first blank and at least one second blank and the first and at least one second blank are physically, frictionally and/or adhesively joined to one another, wherein the first blank comprises an ultrahigh-strength, monolithic material, wherein the at least one second blank comprises a metallic multilayer composite and the monolithic material and/or the metallic multilayer composite has different thicknesses in regions, and is configured as a flexibly rolled metal sheet or strip, wherein the metallic multilayer composite comprises at least three metallic layers, wherein at least a metallic core layer of the at least three layers has a different composition as compared to at least one metallic covering layer.

2. The metal sheet or strip according to claim 1, wherein the metallic core layer of the at least three metal layers has a higher strength as compared to at least one metallic covering layer.

3. The metal sheet or strip according to claim 1, wherein at least one further blank is joined physically, frictionally and/or adhesively to the first and/or second blank, wherein the further blank comprises a metallic multilayer composite or monolithic material.

4. The metal sheet or strip according to claim 1, wherein the first blank comprises an ultrahigh-strength steel material.

5. The metal sheet or strip according to claim 1, wherein at least one layer of the metallic multilayer composite comprises an ultrahigh-strength steel material.

6. The metal sheet or strip according to claim 1, wherein the first blank comprises a hardenable steel material.

7. The metal sheet or strip according to claim 1, wherein at least one layer of a metallic multilayer composite comprises a hardenable steel material.

8. The metal sheet or strip according to claim 1, wherein the metallic multilayer composite comprises at least three metal layers including a core layer.

9. The metal sheet or strip according to claim 8, wherein the core layer comprises an ultrahigh-strength steel material.

* * * * *